March 15, 1966  R. J. LOOFBOURROW  3,241,100
DIGITAL SEISMIC RECORDING SYSTEM
Original Filed Oct. 14, 1959  5 Sheets-Sheet 3
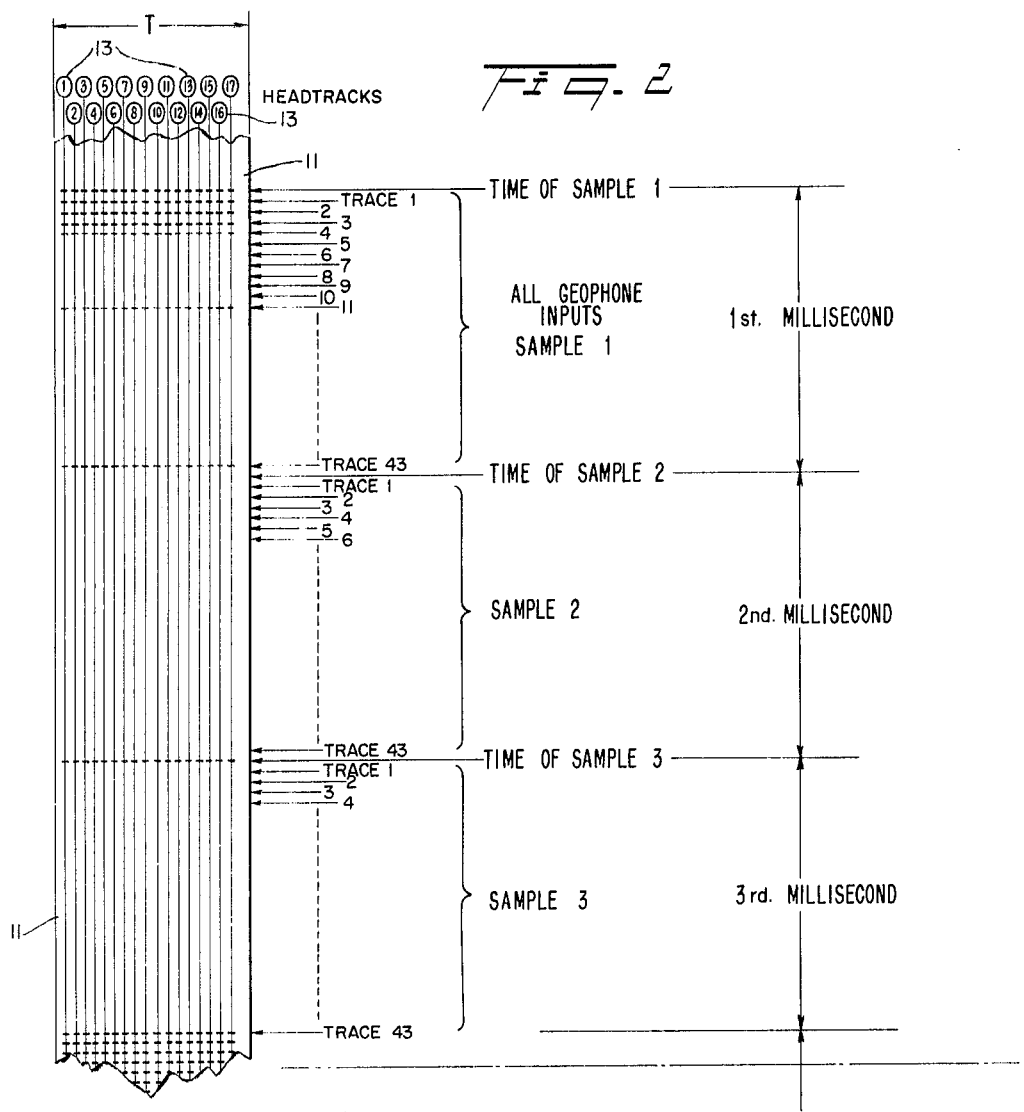
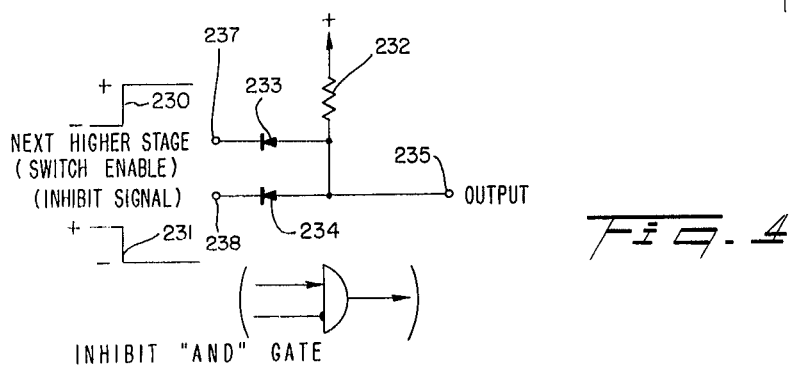

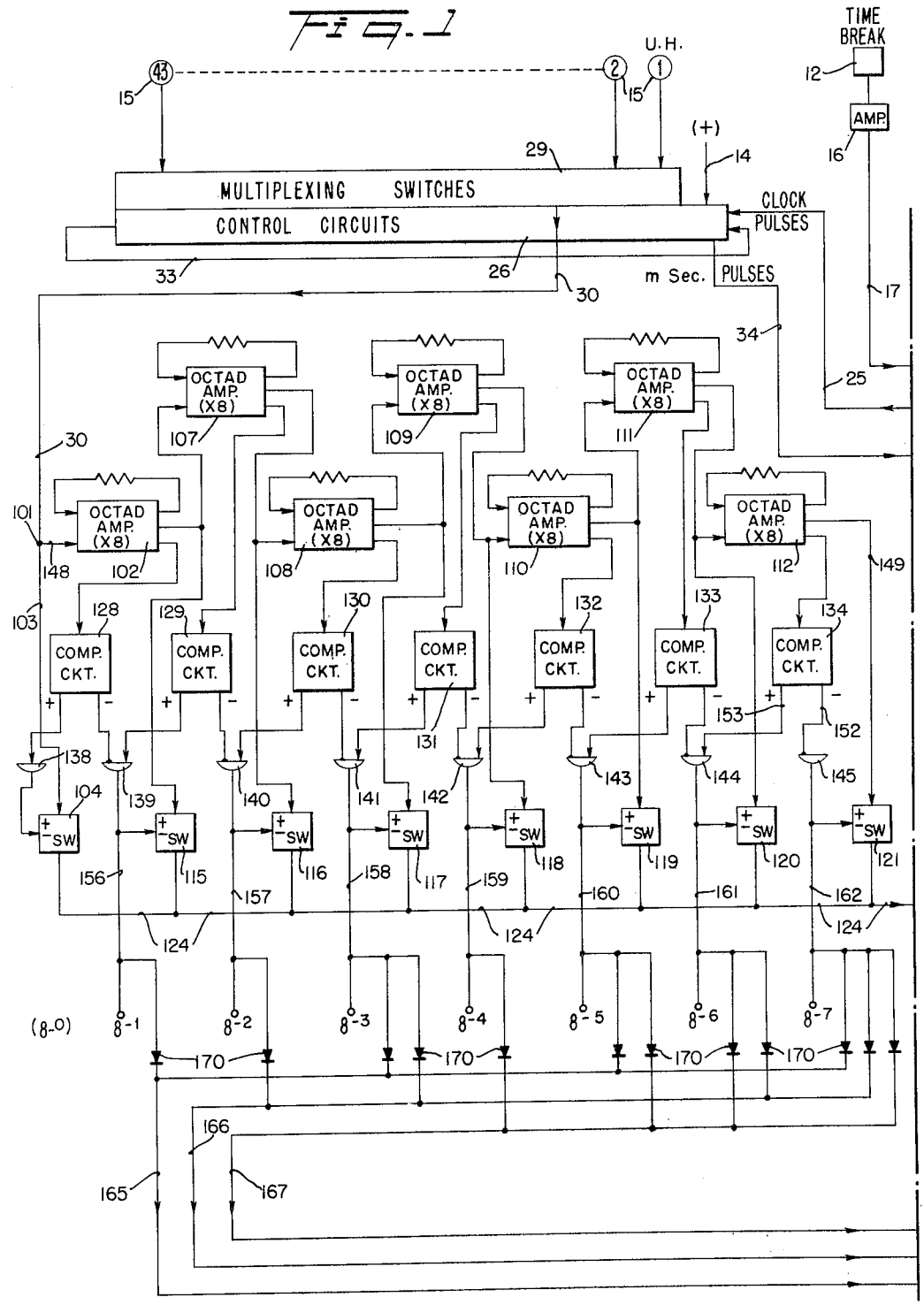

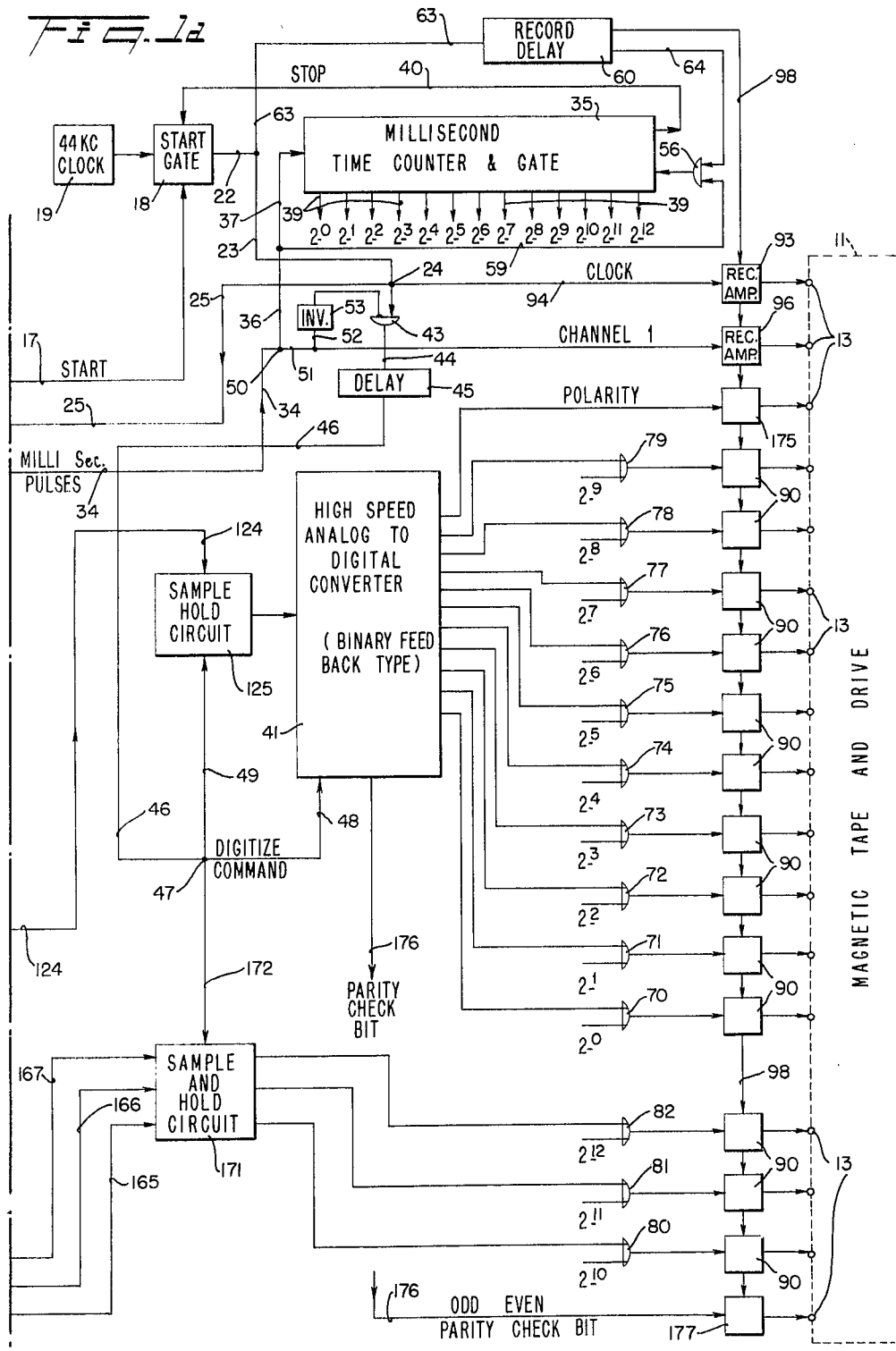

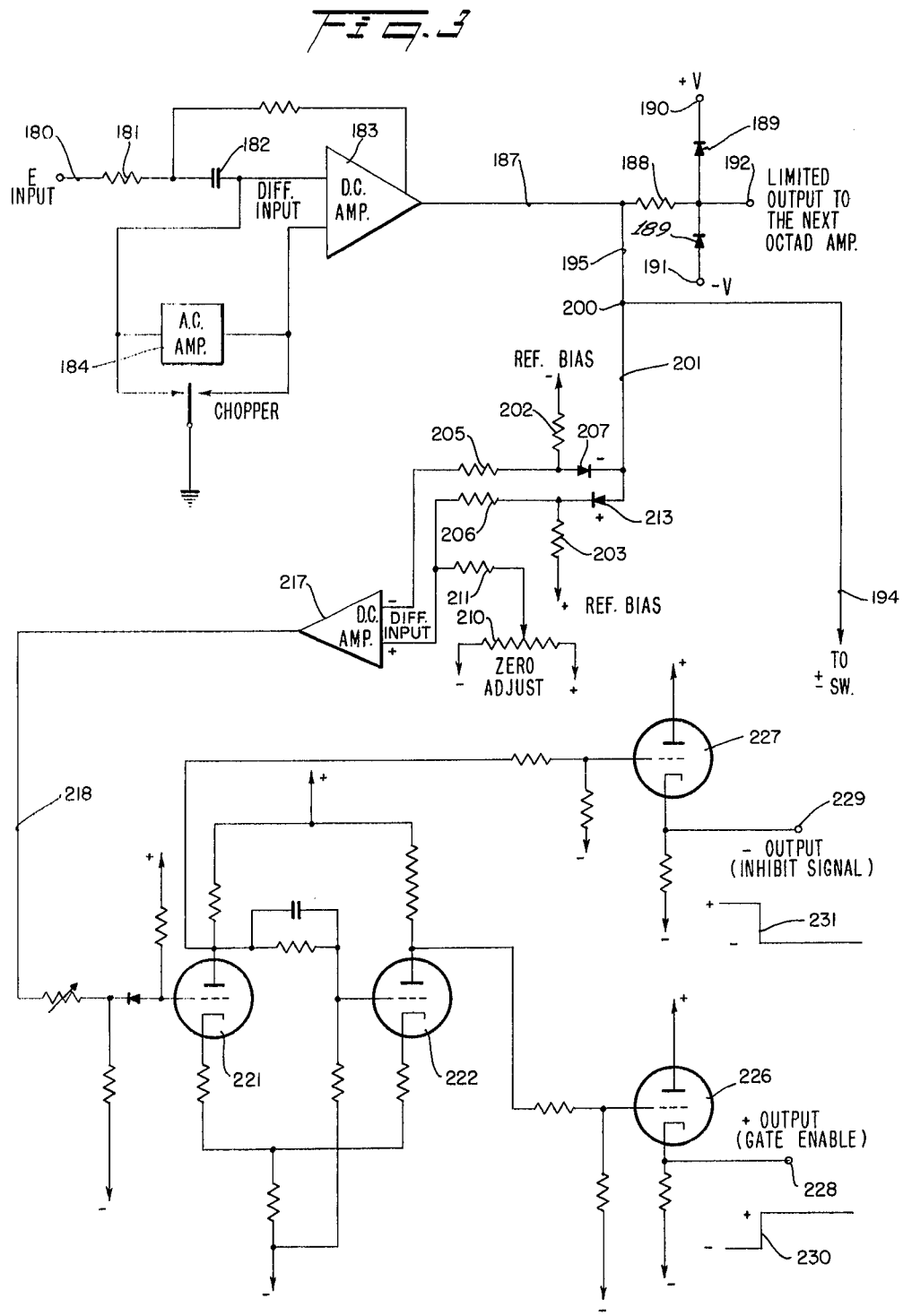

March 15, 1966 R. J. LOOFBOURROW 3,241,100
DIGITAL SEISMIC RECORDING SYSTEM
Original Filed Oct. 14, 1959 5 Sheets-Sheet 5

United States Patent Office 3,241,100
Patented Mar. 15, 1966

3,241,100
DIGITAL SEISMIC RECORDING SYSTEM
Robert J. Loofbourrow, Houston, Tex., assignor to Texaco Inc., New York, N.Y., a corporation of Delaware
Continuation of application Ser. No. 846,435, Oct. 14, 1959. This application Mar. 8, 1965, Ser. No. 446,454
8 Claims. (Cl. 340—15.5)

This is a continuation of application Serial No. 846,435, filed October 14, 1959.

This invention is concerned with digitizing of seismic records in general. More specifically the invention concerns the making of a digital type record of full dynamic range without using any AGC type of compression.

In spite of the presently advanced state of the art in seismic exploration, there have been few proposals for overcoming the difficulties that are created by reason of the necessary compression of the dynamic range of signal amplitudes that are involved in seismic exploration work. In other words, because of the extreme dynamic range of input signals that are obtained in seismic exploration, particularly where explosives are employed to create the seismic energy that is used and especially where the reflection type of record is made for receiving reflected seismic waves from subsurface strata at relatively great depths; the resulting record that is created provides little or no indication of the exact amplitude of the input signals at any given moment, on the record. Thus, for example, a typical signal level for a reflection seismic record runs from several volts of amplitude at the maximum, early shock portion of the record, to less than a single microvolt at the end of the record where microseisms are being picked up. Therefore, for practical purposes in order to make a record, there has been some form of compression employed to maintain a much reduced range of output signal amplitudes. For these reasons, there are two major drawbacks involved in the resulting records that have been made. One of these drawbacks is that no accurate knowledge of the exact amplitude of the input signals at any given place on the record may be had. Secondly, there is the factor that considerable weak changes of input signal may have been masked or entirely lost in the recording of the signals; by reason of the compression which must always involve some time constant in the compression circuit elements thereof.

Of course if a direct transformation of the full range of signal levels to a binary digital representation is made, the compression could be done away with; but the construction of the equipment for making such a direct transformation would present difficulties both economically and technically, mostly because of the extreme amplitude range of the signals.

Consequently, it is an object of this invnetion to overcome the foregoing difficulties that have been involved in the prior seismic methods, by making a digital type of record that encompasses the full dynamic range of the input signals.

Another object of the invention is to make a digital record directly from seismic signals as they are being received from the geophones, e.g. at the time of the detonation of a seismic wave generating explosive charge.

Another object of the invention is to provide a special amplifier system, for use generally wherever it may apply. Such amplifier system is one that accomplishes a breaking down of an extensive input signal range into a number of separate parts, with the inclusion of switching from one to another part, so as to keep that part connected to the output which encompasses the then signal of the full input range, at any given time.

Briefly, the invention may be described as a seismic recording system which comprises in combination a means for detecting seismic energy in the earth's surface and producing an analog signal in accordance therewith. The signals in such system have a dynamic amplitude range that is too great for recording mediums without compression. The system also comprises means for converting said analog signal to a digital signal at frequent intervals relative to a period of the analog signal. The said converting means includes means for digitizing said analog signal over the full dynamic range thereof with a maximum error of less than one part per one hundred and twenty-five. The system also comprises means for recording said digital signals.

Another feature of the invention may be briefly described as an amplifier system for producing output signals having a predetermined limited dynamic amplitude range that constitutes a predetermined portion of the full range of input signals. Such system comprises in combination an input signal circuit, and a plurality of amplifiers in series. The system also comprises a common output circuit for all of said amplifiers and a switch means for selectively connecting one of said amplifiers at a time to said output circuit. In the system, each amplifier is connected to the output circuit only so long as the output signals thereof fall within the predetermined limited range.

The foregoing and other objects and benefits of the invention will be appreciated more fully in connection with the more detailed description which follows and which is illustrated in the drawings, in which:

FIGS. 1 and 1a together illustrate a complete schematic showing of a system for making a digital record of the signals that are generated by a group of geophones;

FIG. 2 is an illustration indicating the physical location of the digital information on a record strip, e.g. a magnetic tape;

FIG. 3 is a schematic circuit diagram, illustrating in more detail the elements involved in one of the comparison circuits shown in FIG. 1;

FIG. 4 shows the circuit elements involved in a typical one of the so-called and gates of the system shown in FIG. 1;

Figure 5:
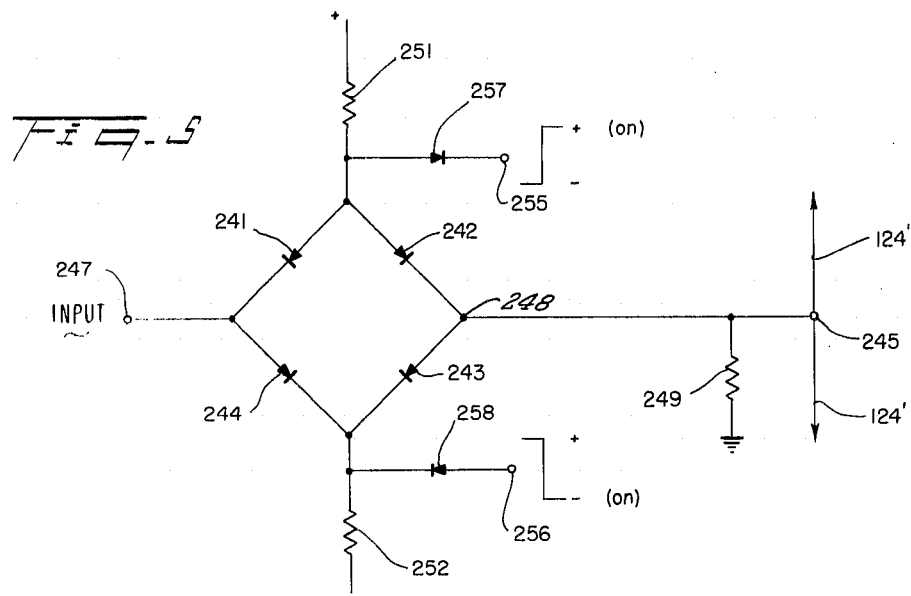
Figure 6:
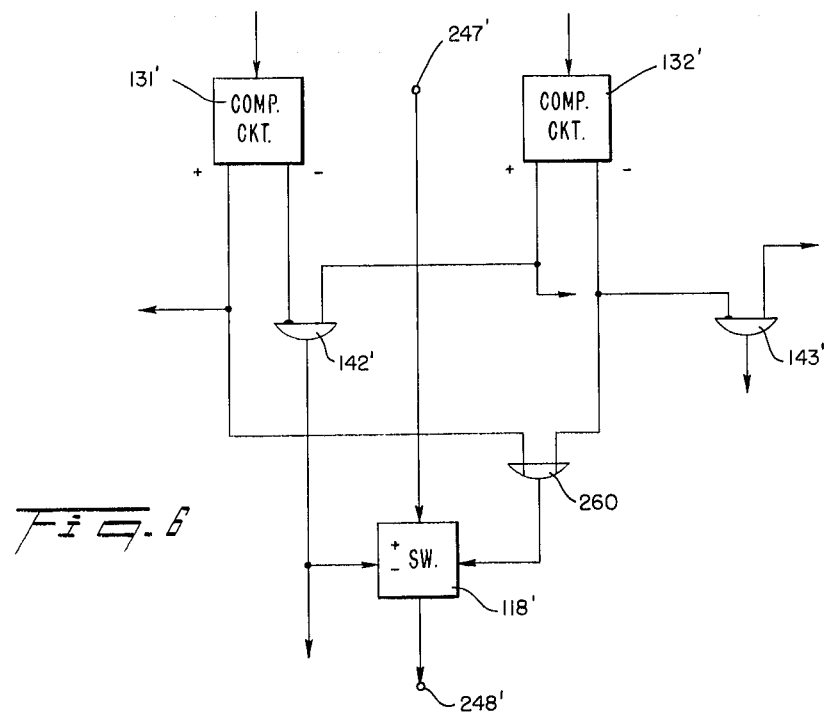

FIG. 5 is a schematic circuit diagram showing a particular type of bidirectional switch that may be employed as one of the switch elements of the FIG. 1 system; and, FIG. 6 is a schematic block diagram showing one of the bidirectional switch elements and its relationship to the adjacent comparison circuits of the FIG. 1 system, which indicates the changes that are required where a bidirectional switch according to FIG. 5, is to be employed.

In order to understand the system according to this invention, a background review of the procedures involved in seismic exploration generally, will be helpful. It will be appreciated by anyone skilled in the art, that in seismic exploration and most particularly in reflection type of seismic exploration work, the general procedure involved includes the following steps. First, a shot hole is drilled in the earth in order to provide a most effective way of detonating an explosive charge for generating seismic energy, at a given point on the earth's surface or near the same. Thus, the most familiar procedure generally employed is that of using a shallow hole drilling rig to drill a shot hole on the order of twenty to one hundred or so feet deep. Then, a charge of explosive is loaded in such shot hole, near the bottom thereof; and usually tamped by covering the charge with water or similar fluid.

Of course there are other techniques, such as that of dropping a heavy weight from some predetermined height above the surface of the earth in order to generate the seismic energy required (by such weight striking the earth).

Next, the procedure involves spreading out along the surface of the earth a plurality of seismic energy detectors, most commonly referred to as geophones. Where a shot hole and expositive charge is employed, the geophone spread usually includes one so-called "uphole" geophone that is located substantially at, or close to the top of the shot hole to receive the seismic energy which arrives at the surface directly above the explosive charge. All of the geophones will be connected electrically to an instrument truck, or other equipment for transporting the necessary instruments that are employed in making a record of the seismic energies which are represented at the output of the geophones by electrical signals.

Finally, a record is made on some recording medium such as magnetic tape, which records the signals that are generated by the geophones during the period from just prior to the detonation of the explosive charge, to a desired time following such detonation, so as to include on the record the seismic energy arrivals. These arrivals include first the energy directly from the explosive charge, and then the energies arriving indirectly from reflections that take place at different density changes in the subterranean strata below the location of the explosive charge.

In reflection seismic recording, the usual time duration for a given record is from about one second up to several seconds. The usual maximum is about four or five seconds. The record of energy that is thus made may take various forms; and the most common (that is old and well known to anyone skilled in the art of seismic exploration work) is an oscillographic type of record having a separate trace on the record for each of the geophone inputs that are connected to the recording equipment from the plurality of geophones (or groups of geophones) that have been spread out along a given line on the surface of the earth. In such a familiar type of record, the traces appear as parallel wavey lines, running longitudinally along a photographic type record strip. Of course, if a magnetic type recording is made, no such visual lines or traces appear on the magnetic tape; but rather, the magnetic properties of the material on the surface of the tape are changed along separate longitudinal channels or tracks corresponding to the traces of an oscillographic type record, so as to provide the data permanently recorded in a manner that may be reproduced with the proper equipment.

In the preferred type of apparatus that is employed according to this invention, a magnetic tape is likewise employed as the record medium; but, the recording of data in this magnetic tape takes a form that is not directly comparable to the prior art magnetic record just described above, which involved the making of magnetic data recordings along a given track for each of the geophone signals. Rather, as will appear in contradistinction to the foregoing, the present invention involves time sharing digital information recording, such that the data as recorded in the magnetic tape is impressed transversely across the magnetic tape for each individual geophone. By using the time sharing relationship, the successive geophones are recorded in sequence repetitively along the record. This is illustrated in FIG. 2, where a sample record strip is shown with an indication of the location on such record strip (magnetic tape) of the points where digital data is recorded. These bits of digital data are recorded individually by the numbered magnetic recording head elements 13 which are located transversely across the width of the magnetic tape in a staggered arrangement. The staggered location of these heads is merely for convenience in obtaining closer spacing; and insofar as an understanding of the location of data on the tape is concerned, it is sufficient to assume that all of the magnetic spots of data from the heads lie transversely across the tape on a single line, as is indicated by the captions on the right hand side of the strip 11 in FIG. 2.

It will be understood that the FIG. 2 illustration is schematic and provides a physical indication of the location of digital data on a magnetic tape 11. Also, the actual manifestation of the magnetic data does not necessarily provide any visual indication or change on the tape itself. However, as the tape is driven longitudinally past the recording heads (which are located transversely across the width of the tape) the data is recorded in parallel as explained above. Consequently, the presence or absence of a bit of magnetically recorded data at each of the entire group of recording heads 13, is provided simultaneously so that one short-time piece of data is recorded at each of the transverse locations across the tape. These pieces of data follow one another in rapid succession and are spaced apart longitudinally along the record strip because of movement of the strip 11 past the heads 13.

Of course, many different time bases may be employed; but in the preferred example that is herein described, the basic timing unit is provided by a forty-four kilocycle clock source. This means that there is a record made in parallel across the tape at a forty-four kilocycle rate. Of course, the tape strip 11 is driven past the heads 13 at a high rate of speed, e.g. on the order of sixty, to one hundred and twenty inches per second. With the illustrated system, the time base employed means that there are forty-three channels available for use in connection with the geophone inputs, while the forty-fourth time cycle of the clock pulses is employed to make a time count and record same. This means that every geophone channel is sampled once each millisecond, and there are about twenty-two microseconds during each of the clock pulse cycles. Thus, the time sharing arrangement, with multiplexing (switching) from one geophone channel to the next, makes a record in the form that is indicated in FIG. 2.

By arbitrarily starting with the time count cycle, the first clock pulse is that used to make a record of the time involved during the seismic record period. Thereafter, for forty-three clock pulses in sequence, the multiplex switching, sweeps over the geophone circuits from one end to the other so that the forty-three traces are recorded in sequence across the magnetic tape strip 11. Consequently a record is made of the time once every millisecond throughout the record. This time count involves keeping a digital count of the millisecond clock pulses, and recording this in binary code across the tape 11 during the period of that particular clock cycle. A complete sweep of the forty-three traces preceded by a recording of the time count, is all completed in one millisecond since the clock pulse rate is governed by a forty-four kilocycle signal. This sweep procedure repeats continuously for the duration of the making of a record. Therefore each geophone channel signal is sampled and recorded once every millisecond, and the traces thus recorded lie transversely across the record in sequence at the physical spacing determined by the speed of drive of the tape strip 11. All this is indicated by the captions on FIG. 2.

Referring to FIGS. 1 and 1a, the system and the elements involved therein may be described as follows:

There is an explosion time-break input circuit 12 for providing signals that are the starting point of a particular record that is taken when a charge is detonated in a shot hole. In addition there are shown forty-three geophones 15 that are spread out along a given line from the shot point beginning with an up-hole geophone that is located close to the top of the shot hole.

As indicated above, each of these forty-three geophones 15 might be a group of several geophones connected together to form a common geophone signal channel. Also, it will be appreciated that the number of geophone channels employed might be less than forty-three, e.g. some of the channels might be left idle, if desired. In addition, if the seismic energy is to be generated by some means other than by use of an explosive charge; the usual time-break circuit 12 would be replaced by some appropriate signal generating device, e.g. where a weight is dropped there could be a switch actuated by the weight dropping apparatus at the time the weight falls.

The time-break circuit 12 is connected directly to an amplifier 16. The output of amplifier 16 is fed over a circuit connection 17 (FIGS. 1 and 1a) that leads to a start gate 18 which controls the output of pulses from a forty-four kilocycle clock oscillator 19. Clock pulses from the clock 19 are fed to the gate 18 as indicated, and when the gate is open the clock pulses may continue over a circuit that includes a connection 22 and another connection 23 to a common junction point 24. From junction 24 these pulses are carried over a connection 25 (FIGS. 1a and 1) to an input of control circuits 26, that control and actuate a plurality of multiplexing switches 29, which in turn have the geophones 15 connected thereto for being switched in a multiplexing manner, i.e. in sequential connection to a common output circuit connection 30.

It will be appreciated that the multiplexing switches and control circuits in connection therewith may take various forms and the particular circuit elements involved form no part per se of this invention. One example of some circuits that may be employed to accomplish the desired multiplex switching and the control therefor, is found as a number six article of a series of articles titled "Digital Automation" and published in 1956 by Instruments Publishing Company, Pittsburgh, Pennsylvania. This particular article is titled "Multiplexing" and the authors are Martin L. Klein, Frank K. Williams and Harry C. Morgan.

For the purposes of this invention, it is sufficient to understand that the control circuits 26 involve a plurality of sequentially actuated flip-flop elements; or some other similar arrangement for switching in sequence each of the output circuits from geophones 15 to the single common output circuit 30. By only employing forty-three geophones to be so switched in a multiplexing manner, an open channel 14 may be left for providing a special output pulse once every forty-four pulses. Thus, the control circuit elements 26 involve a ring type connection for making continuous operation so long as the clock pulses are arriving over the circuit connection 25. This is indicated by the return circuit connection 33 shown, which goes from the left hand end of control circuits element 26 to the right hand end thereof.

When the blank position (channel 14) is connected, i.e. when the control circuit elements stand in the extra position such that none of the forty-three geophones 15 are connected to the output circuit 30, a special output circuit 34 is provided to carry a so-called "millisecond" pulse. Such pulse may be an appropriate voltage that is connected to the circuit 34 when the extra flip-flop element of control circuits 26 is in the opposite state from all the other elements of the ring. This voltage or pulse is connected to a millisecond time counter 35 via circuit connections 36 and 37, in addition to the connection 34.

The time counter 35 maintains a digital count of the millisecond pulses that are fed thereto; and it is provided with an arrangement to give an output signal at the end of a predetermined time, e.g. five seconds, which output signal is fed over a circuit connection 40 that leads to the start gate 18 for closing the same. There are thirteen parallel output circuits 39 for reading out the total count of millisecond pulses in binary form, as will be described more fully below.

In addition to the above-mentioned circuit to counter 35, there is another circuit for millisecond pulses whereby they are also fed to an inhibit circuit arrangement for preventing the operation of a high speed digital converter 41. In this manner, during the period of the millisecond clock pulse cycle, the action of the digital converter 41 is inhibited. This provides for a cycle, or recording time, when the time count may be recorded.

During the forty-three clock pulse cycles (when the geophones 15 are being sequentially connected to the digital converter 41) the converter 41 is being triggered by the arrival of these clock pulses over a circuit that may be traced directly from the junction point 24 to an inhibit "and" circuit 43. Inhibit "and" circuit 43 has an output connection therefrom that leads over a circuit connection 44, and through a delay element 45. From the other side of delay element 45 the pulses proceed over a circuit connection 46 to a junction point 47 and then over a circuit connection 48 to the converter 41, as well as over a connection 49 to the sample hold circuit 25. Consequently, after a predetermined delay in element 45, the clock pulses are fed to the converter 41 and act to trigger the digitizing operation of the converter.

At the and gate 43, when a millisecond pulse is created by the clock pulse that sets the control circuits 26 to the blank or extra circuit connection 14, as explained above; the clock pulse that is passing through gate 43 will be inhibited or blocked from passing. Each millisecond pulse provides this inhibiting action by reason of the circuit connections shown which include a circuit connection 51 that leads from a junction point 50 between connections 34 and 36 to a connection 52 that leads to the input of an inverter 53. The output of inverter 53 leads to the other input of the inhibit and gate 43, as shown.

Counter 35 may take any feasible form, and the details form no part per se of this invention. The only requirement of the counter 35 is that it be binary with parallel outputs, and that it be high speed in its operation so that the total count output may be provided during the duration of one pulse cycle from the clock 19 including switching time. It will be remembered that such pulse cycle has a duration of only about twenty-two microseconds. Of course, if the counter 35 is not fast enough to accomplish this the clock pulse rate of forty-four kilocycles must be reduced. Likewise, should the switching time be too great insofar as the converter 41 is concerned, the clock pulse rate would have to be reduced somewhat. In either case the result would be merely to reduce the number of samples taken of the signals during any given period of time.

The input pulses to be counted in the counter 35, arrive via the circuit connection 37 and are read out from the output in straight binary form, after a short delay which provides time for the counter operation. This readout of counter 35 is controlled from an and gate 56 that is not an inhibit and gate like gate 43, but rather a straight and gate such that only when input signals exist on both of its inputs simultaneously is an output signal passed through. Consequently, the millisecond pulse arriving over circuit connection 36 to reach connection 37, also passes over a circuit connection 59 that leads to one of the inputs of and gate 56. This pulse, however, does not pass through the and gate 56 at this instant, but must await the arrival of a delayed pulse which is passed from a record delay circuit element 60 that is receiving clock pulses after they have passed through the start gate 18. These pulses travel over a parallel circuit connection 63 to the input of delay element 60. The delay element 60 has two output connections, and these pulses are travelling to the and gate 56 over a connection 64. The delay time is provided in order to allow the time counter 35 to complete its operation. The read out operation is triggered by the passing of a signal through and gate 56 into the counter 35. The binary signal bits from the output of the counter 35 are provided in accordance with the then existing count over the indicated thirteen circuits.

It will be observed that there are a plurality of or buffers 70 through 79 inclusive and 80, 81, 82 while have the captions on one of the input circuits thereof in terms of a binary output, i.e. marked two raised to a given power. It will be observed also that these captions correspond with the markings or captions adjacent to each of the output circuits 39 for the binary bit signals from the millisecond time counter 35. The binary bit signals which thus are delivered from the counter 35 pass through the corresponding or buffers (70–82) and are delivered to one of a group of corresponding recording amplifiers 90 which provide the required power amplification for making the magnetic spots that represent bits of information on the magnetic tape 11.

In this manner, once every forty-four of the clock pulses, a millisecond pulse is created at the control circuits 26 for the multiplexing switches 29; and this millisecond pulse is counted at the millisecond counter 25. The total number of millisecond pulses at that time that have been stored in the counter 35 are read out, to be recorded across the magnetic tape 11 in parallel as already explained above. It will be observed that with twelve channels of binary outputs from counter 35, the required five seconds (which represent five thousand milliseconds) may be easily covered. This is clear since an output from the highest power channel $2^{12}$, represents 4,096 counts, and the additional 904 counts are covered by the remaining channels.

In addition to the recording amplifiers 90, there is a recording amplifier 93 for the recording of each of the forty-four clock pulses which are fed to amplifier 93 from junction point 24, via a circuit connection 94. Similarly there is a recording amplifier 96 that feeds one of the recording heads 13. The input circuit connection for amplifier 96 has a caption on it indicating "channel 1." It may be noted that every clock pulse is recorded, and also every millisecond pulse is recorded in addition to the total count for the number of millisecond pulses. Such total count recording takes place as each millisecond pulse arrives.

It will be observed that there is a circuit connection 8 which extends from the delay element 60 to each and every one of the recording amplifiers 90 and 93, 96, 175 and 177. This connection provides for triggering the recording amplifiers after the preliminary delay for the purpose of allowing time for the count to be complete, or for the transformation from analog to digital to be carried out during each clock pulse interval. Thus, this delay is long enough to hold back each pulse until near the end of the duration of a clock pulse cycle.

During each of the intermediate forty-three clock pulses, i.e. these clock pulses between the millisecond pulses; the action and the elements involved in the system remain substantially the same. The only exception is, of course, the separate geophone 15 and the corresponding input circuits to the multiplexing switches 29. In other words, after the multiplex switching takes place, the signals all pass over the common output circuit 30 that carries signals which are derived successively from one to the other of the geophones 15 as already indicated above. Thus, the action is substantially the same for each of the output signals which pass over circuit connection 30; and an explanation of what happens to one of the signals (as they are sampled from each of the geophones 15) will be sufficient to explain what happens to all of them.

As has been indicated above, the signals being generated by the geophones 15 are sampled by being connected through the multiplexing switches 29 sequentially for a period of time having a duration of about twenty-two miscroseconds. Furthermore, any given one of the geophones 15 has its output signal sampled once every millisecond during the entire recording as it is made. This provides for adequate sampling of the signals that are being generated by the geophones, since the geophones output signal data of interest is in a low frequency range, e.g. in the neighborhood of one hundred cycles per second.

Each sample of a geophone signal, passes over the circuit connection 30 to a junction point 101 and then goes to the input of an octad amplifier 102 in addition to travelling over another parallel circuit connection 103 to bidirectional switch 104. It will be observed that there are six more octad amplifiers 107 through 112 that are connected in series. Also there are additional bidirectional switches 115 through 121.

The output side of each of the bidirectional switches 104 and 115 through 121, are connected in parallel to a common circuit connection 124 for carrying the output signals from any one of the switches that is open, over to the input of a sample-hold circuit element 125. This sample-hold circuit 125 receives each of the sampled signals, and holds it for the period necessary to complete the conversion from analog to digital that takes place in the high speed converter 41. As the signal arrives at the sample-hold circuit 125, it is not encoded by the converter 41 until after a short delay that is determined by the delay element 45. This is done in order to allow time for switching transients to be dissipated.

The sample-hold circuit 125 may be considered part of the converter 41, and as with regard to the converter, the details of the sample-hold circuit per se form no part of the invention.

The sampled signal, that is to be converted to a digital representation thereof for recording, is held within a predetermined amplitude range or signal level for introduction to the converter 41. This is accomplished by means of the system according to this invention, which includes in addition to the octad amplifiers 102 and 107 through 112, a plurality of comparator circuits 128 through 134 and the bidirectional switches 104 and 115 through 121. These bidirectional switches 104, 115–121 are electronic in nature and could be termed gates, but to avoid confusion with the different "and" gates and "or" buffers shown, will be called switches. They are under control of inhibit and gates 138 through 145.

The operation of the system for maintaining the amplitude of the output sample signal within a constant range for application to the converter, may be understood in general with reference to the system showing of FIG. 1. Thus, beginning with a minimum amplitude signal over the circuit connection 30; it is pointed out that all of the switches 104 and 115 through 120 are held open, whereas switch 121 is the only switch that is closed under these conditions. Consequently, from a zero amplitude signal up to a predetermined very small amplitude, the signal will be directed to the input of the octad amplifiers 102 and 107 through 112 in series via an input connection 148 from the junction point 101. Therefore this signal is amplified 87 times and then is delivered over a circuit connection 149 to the bidirectional switch 121. So long as the signal remains below a predetermined amplitude, it is thus delivered over the circuit 149, through the closed switch 121 and to the common output circuit 124 for delivery to the converter 41 via the sample-hold circuit 125. However, as soon as the signal exceeds such predetermined amplitude, this condition will be determined by the comparator circuit 134, and it will provide output signals over a pair of circuits indicated by connections 152 and 153.

The signal carried by circuit connection 152 is in the nature of an inhibit signal. The specific nature of this signal will appear more fully below. Here, it is sufficient to note that the inhibit signal will pass through the inhibit and gate 145, and act to inhibit or open the switch 121 which was otherwise closed. Simultaneously, an enable signal will be provided from comparator circuit 134 over the other output circuit 153. This enable signal will be delivered to another inhibit and gate 144 which will pass this enabling signal to the bidirectional switch 120 so as to close it.

In the foregoing manner, the output signal delivered to the common circuit 124 is not allowed to exceed a predetermined maximum amplitude; but it is dropped back to a preceding stage of the series of steps of amplification (octad amplifiers 102, 107–112) so that it is delivered to the circuit 124, once again within the predetermined amplitude range that is desired (for the input signals to the converter 41).

This procedure continues back down, or on up, the series of amplifiers so as to maintain the output signal that is connected to the common output circuit 124, always within the same amplitude range. Thus, as the amplitude of the input signal carried by connection 30 reaches its maximum range, the signals to the output circuit 124 will be those carried by the circuit 103 to the switch 104. This circuit goes directly to the output circuit 124 without any amplification at all so long as the signals remain in the predetermined range.

Because of the fact that any one of the digitally recorded signals that goes in binary form on the magnetic tape, will be indistinguishable from any other of the signals that are derived from different amplitude ranges; an indication must be carried to determine which amplitude range the signal lies within. This determination is made in a straight binary manner, by merely providing output signals that correspond to the enable, or closed condition for each of the bidirectional switches 104 and 115 through 121.

By using a straight binary system it is not necessary to provide a signal output in correspondence with the enable condition of the switch 104, for the reason that this switch being closed represents the 1:1 ratio of signal amplitudes between the input and the output; and such condition may be represented by a zero or absence of any signal. Furthermore, since it is only necessary to indicate which of seven switches (i.e switches 115 through 121) is closed, or enabled; a pure binary signal output circuit arrangement is employed, using only three circuits in combination. Thus, there is a circuit connection 156 through 162 that leads from the output, in each case, of the corresponding inhibit and gate 139 through 145 respectively. These connections (156–162) each lead to an indicator output terminal that is captioned $8^{-1}$ through $8^{-7}$ respectively. Of course, these indicator output circuits may have some type of indication element (not shown) connected thereto for indicating which one of the circuits is in an enable condition. However, for recording in digital form on the magnetic tape record, it is most expedient to employ three common circuit connections 165, 166 and 167 for providing binary type indication of which one of the switches 104, 115–121 is in the closed or enable condition. The binary type output is applied to the three circuits 165, 166 and 167 by means of a plurality of diodes 170 that connect each of the indicator circuits to the proper one or more of the three binary indication circuits so as to provide a straight binary output indication of the indicator circuit that is energized. The signals that are thus carried over the three circuit connections 165, 166 and 167, are delivered to the input of another sample and hold circuit 171 (FIG. 1a). Then these signals are sent on (when the delayed clock pulse is received from the junction point 47 over a circuit connection 172) to the or buffers 80, 81 and 82 via the illustrated circuit connections to the corresponding recording amplifiers 90 for actuation of the corresponding recording head 13 located adjacent to the indicated three tracks on the magnetic tape record.

In view of the foregoing explanation of the system, it will be understood that as each channel signal passes through the system, it is automatically switched so as to be connected directly (or after passing through one or more stages of amplification by the amplifiers 102, 107–112) to the circuit that leads to the analog-digital converter 41. This is done in order to maintain the amplitude level within a predetermined range. The signal is thus passed into the high speed analog to digital converter 41 where the conversion operation takes place.

The conversion is carried out in a small number of microseconds, and provides binary output signals in parallel over the indicated circuits. These binary signals are transmitted via the or buffers 70–79, and directly, to the recording amplifiers 90, and 175 respectively. Then the recording amplifiers are triggered to cause a binary representation of the sampled signal to be recorded on the magnetic tape 11.

At the same time as this is carried out, the range of the sample is recorded by the above described system arrangement for recording in binary code, the particular range switch that is passing the signal. The latter binary code data is recorded by the lower three recording amplifiers 90, that have the inputs thereof connected to or buffers 80, 81 and 82.

It is pointed out that the analog to digital converter 41 may taken any feasible form, and forms no part per se of this invention. However, it is preferred that a converter be employed of the type that provides for making comparisons with reference signals having amplitudes that are in steps of one half, one quarter, one eighth, etc. so as to be carried out for a binary digital determination that goes to an accuracy of one part in one thousand and twenty-four parts for each polarity signal. This will provide a desired high degree of accuracy. The digital representations of the signal is thus provided by output signals over the circuits from converter 41 that lead to one of the two inputs of each of the or buffers 70 through 79 as indicated. In addition there is an output circuit that is marked with a caption "polarity" which leads to a recording amplifier 175 that feeds the recording head 13 adapacent to the third track down (as viewed in FIG. 1a) on the magnetic tape 11. It will be appreciated that the polarity circuit of the output of converter 41, is in effect an additional binary output channel that divides the total range in two so that the signal may be expressed in terms of positive and negative with the full range of accuracy as determined by the other binary information channels.

Also, there is shown a circuit that is usually employed with digital recording systems for providing a parity check bit. The presence or absence of this parity check bit is carried over a circuit connection 176 and is recorded via recording amplifier 177.

It will be appreciated that there are many different types of amplifiers that may be employed for each of the octad amplifiers 102 and 107 through 112. A preferred type of amplifier, however, is one that is a high gain D.C. chopper-stabilized type of amplifier, which has enough negative feedback to provide for the required gain of eight in a linear manner throughout the full range. One such amplifier is a commercial item that is known as a "Philbrick Operational Amplifier—U.S.A.—3." Such amplifier is manufactured by George A. Philbrick Researchers Incorporated, Boston, Massachusetts.

FIGURE 3

It has been pointed out above how the system operates to maintain the output signals (from the series of octad amplifiers 102, 107–112) on the common output circuit 124, at a given amplitude range. A more detailed explanation of this operation is as follows, in connection with the more detailed circuit illustration of FIG. 3. Referring to FIG. 3 it is pointed out that there is shown a typical octad amplifier which may be one of the amplifiers 102 or 107 through 112. Each such amplifier includes an input circuit connection 180 that leads to the input of the amplifier through a resistor 181 and a capacitor 182. It is pointed out that the total amplifier includes a D.C. amplifier 183, and a chopper stabilizer with an A.C. amplifier 184 as indicated by the captions. The output of the octad amplifier, leads over a circuit connection 187 to an amplitude limiting circuit arrangement that precedes the connection of this output to the input of the next succeeding octad amplifier. This amplitude limiting arrangement includes a resistor 188 and a pair of diodes 189 that are connected to terminals 190 and 191 which have a positive voltage and a negative voltage respectively, connected thereto for setting the level of the amplitude limiting action desired. As indicated by the caption, the output as thus limited is connected to a terminal 192 that will be connected to the input of the next succeeding octad amplifier. This amplitude limiting arrangement is provided in order to avoid overloading or saturating the amplifier that receives the output signals from this stage of amplification. It will be appreciated that the limiting voltages applied at terminals 190 and 191 will be set so that the desired range of a signal amplitudes may pass without being limited.

It will be observed that there is output circuit connection for signals from the octad amplifier, prior to the limiting action, i.e. from the circuit connection 187 to a circuit connection 194 directly, via a connection 195. Connection 194 leads to the corresponding bidirectional switch element for the particular stage of amplification of the system. Thus for example, if the octad amplifier being considered in detail is taken as amplifier 109 (FIG. 1), the bidirectional switch to which circuit connection 194 is connected, will be the switch 118.

Also connected directly to the output connection 187 here is a comparator circuit, which would be comparator 131 of the above example (in the FIG. 1 system). Such comparator may take the form shown in FIG. 3. There is a pair of diode rectifiers 207 and 213 connected to receive the output signals from the octad amplifier, and to pass those exceeding a predetermined amplitude of either polarity.

The diodes 207 and 213 are oppositely connected, as illustrated, to a junction point 200 by a connection 201. Each diode is back biased by a predetermined comparison voltage which is set at the predetermined set maximum amplitude. Thus, a resistor 202 is connected to diode 207 at one end thereof while the other end has a negative potential that acts as the negative comparison voltage, connected thereto as indicated by the caption "Ref. Bias" (—). Similarly the other diode 213 has a resistor 203 connected thereto with the positive reference potential connected to the other end, again as indicated by the other caption "Ref. Bias" (+).

These two comparator circuits are connected to the inputs of a differential D.C. amplifier 217 of a special type having high gain. In this manner, no signal is applied to the input of amplifier 217 so long as the amplitude of the signals from the octad amplifier (on connection 201) do not exceed the predetermined set maximum, either in a positive or a negative sense. When the signals do exceed this amplitude level, either positive or negative; the current flow through the resistor 202 or 203 causes a small voltage drop which is fed to one of the inputs of the amplifier 217 via either resistor 205 or a resistor 206. In either case, the amplifier 217 produces a positive D.C. voltage of considerable magnitude. Such D.C. signal will appear on a circuit connection 218.

There is a zero adjustment potentiometer that is connected to the positive input circuit for the amplifier 217. This merely includes a variable potentiometer-resistor 210 that has the ends thereof connected to a positive and to a negative source as indicated. A resistor 211 has one end connected to the variable tap on resistor 210 while the other end is connected to the positive input circuit of the amplifier 217. The setting of the variable tap will be adjusted to produce a zero output on connection 18 (or slightly negative) when there is no input to the amplifier 217, i.e. when the signals on connection 201 are below the predetermined amplitude.

The amplifier 217 might take different forms; and it forms no part per se of the invention. However, it is preferred to employ an amplifier that is commercially available and is manufactured by George A. Philbrick Researchers, Inc., Boston, Massachusetts, known by the model designation K2-X.

In order to transform the single positive voltage rise signal on the circuit 218 into the required two signals, i.e. gate enable signal, plus the simultaneous inhibit signal; there is employed a Schmitt trigger circuit that is triggered to flip over to its opposite state upon receipt of the single voltage rise signal on circuit 218. Then, there are two cathode follower output signal elements connected to the Schmitt trigger for creating the enable and the inhibit signals themselves. Thus, still referring to FIG. 3 it will be observed that the D.C. amplifier 217 which receives signals carried by the input circuits thereof, and which provides amplifier output signals on the circuit connection 218; feeds the input to a Schmitt trigger circuit. The Schmitt trigger has two triode tubes 221 and 222 that are connected together as shown, in a known manner, which provides for a triggering from one stable state to another upon the receipt of an input signal on the circuit connection 218. The circuit constants of the Schmitt trigger circuit are arranged so that the trigger stands (in the absence of a signal on circuit 218) with the left hand tube 221 cut off and the right hand tube 222 conducting. The voltage divider on the grid circuit of tube 221 is arranged so that when a positive signal voltage appears on circuit connection 218, the grid of tube 221 will be raised to a more positive potential so that the tube will conduct. When tube 221 is changed to a conducting stage, the plate voltage thereof will fall and this voltage drop is transferred by the illustrated circuit to the grid of the other triode 222 so that its grid voltage goes down and it is cut off to become nonconducting.

Then, as indicated above, in order to provide the output enable signal, and simultaneously the output inhibit signal; there is a connection to the plate of each of the Schmitt trigger triodes 222 and 221 respectively. These connections are carried to the grid circuits of a pair of triodes 226 and 227; and these triodes are connected as cathode followers, insofar as the output signals therefrom are concerned. Thus, there is an output terminal 228 that is connected to the triode 226 and provides the enable signal; while there is an output terminal 229 that is connected to the other triode 227 and provides the inhibit signal. Cathode follower tubes 226 and 227 are biased to stand in the opposite state from the Schmitt trigger tube to which they are respectively connected. Thus, when the Schmitt trigger is in its first state (without any positive signal on the circuit connection 218), the right hand trigger tube 222 is conducting but the cathode follower tube 226 that is connected thereto is cut off. Similarly in this same state, the left hand trigger tube 221 is cut off but the cathode follower tube 227 connected thereto is conducting. Consequently when the Schmitt trigger flips over, the indicated signals 230 and 231 are created at the terminals 228 and 229. These signals are sharp changes in potential because the action of the Schmitt trigger is sharp, by reason of its characteristics.

It is pointed out that when the positive signal on connection 218 at the input to the Schmitt trigger disappears, the trigger tubes 221 and 222 drop back sharply to the first state so that the enable and inhibit signals are removed, i.e. the enable positive potential drops to a negative potential again while the inhibit negative potential jumps back to positive.

FIG. 4 shows a typical circuit for one of the inhibit "and" circuits 138 through 145. Such circuit consists of a resistor 232 that has one end thereof connected to a positive potential source, as indicated; and that is connected at the other end thereof to one side of two diodes or rectifiers 233 and 234. The same end of the resistor 232 that is connected to the diodes is also connected to an output terminal 235. The other electrode of diodes 233 and 234 are each connected to an input terminal 237 and 238 respectively. It will be understood that with an inhibit signal circuit connected to one input terminal 238, e.g. to provide signal 231, and an enable signal circuit connected to the other input terminal 237, e.g. to provide signal 230; the resulting output signal(s) will depend upon the input conditions so as to provide for the desired action. This desired action is such that when there is an enable signal but no inhibit signal, there will be a positive output voltage at terminal 235. But on the other hand, when there is an enable signal plus an inhibit signal; the inhibit signal will hold the voltage of output terminal 235 to the negative potential, or no output status, and consequently there will be no output signal. On the other hand, if there is no enable signal on the input terminal to which it is connected; there will be no output signal on terminal 235 irrespective of whether or not there is an inhibit signal on the other input terminal. The latter is true since the enable signal circuit will be held at negative voltage which maintains the output 235 at negative voltage also.

It will be observed that the signal symbols 230, 231 and the captions on both FIG. 4 and FIG. 3 indicate the potential conditions in connection with the circuits. Consequently the manner of connecting these elements into the entire system (that is indicated in block form in FIG. 1) will be amply clear. Furthermore, it will be noted that there is shown in FIG. 4 an indication of the inhibit "and" gate symbol, that is employed in the entire system showing of FIG. 1.

As has been indicated above, the bidirectional switches 104 and 115 through 121, may take various forms and form no part per se of this invention. One such bidirectional switch is shown by a publication in the AIEE Journal for March 1955 entitled "Junction Transistors Used as Switches" by R. L. Bright. Similarly, there is a bidirectional switch that would be applicable, shown in a publication that was presented at the IRE national convention in New York, New York, on March 21, 1956, entitled "The Development of a High-Speed Electronic Multiplexer and Coder for Use With PCM Telemeter" by Robert D. Bishop and Robert E. Marquand. These bidirectional switches are electronic in nature, and are often referred to as gates. The opening and closing of such a switch is under control of a signal on a control circuit; which in the system diagram of FIG. 1 is indicated by the arrow on the left hand side of each of the switches 104 and 115 through 121. These arrows indicate the input gate control circuit in each case, which is connected to the output of each of the inhibit and gates as shown.

It will be observed that each comparator circuit 128 through 134 has two output circuits, e.g. output terminals 228 and 229 of the detailed showing for a comparator circuit that is illustrated in FIG. 3. Furthermore the inhibit signal output circuit (indicated in FIG. 1 by a minus sign) for each comparator circuit, is connected to a given inhibit and gate element; while the enable circuit of each comparator is connected to the other input of the adjacent inhibit and gate. Thus for example, assuming that the FIG. 3 circuit is placed in the FIG. 1 system (as the octad amplifier 109 plus the comparator circuit 131); then, the signal output circuit from the octad amplifier 109 that leads to the bidirectional switch 118, is the circuit of FIG. 3 including connections 187, 195, 200 and 194. At the same time (under these assumptions) the comparator circuit 131 has as its output the two switch control signal circuits shown. The inhibit signal circuit (terminal 229) is connected to gate 142. The enable signal circuit (terminal 228) however is connected to the gate 141, which controls bidirectional switch 117.

The operation of the amplifier system for producing output signals having a predetermined limited dynamic amplitude range, may be reviewed by referring to FIG. 1 and where necessary to FIG. 3. Assuming that the comparator circuit of FIG. 3 is comparator 131 of the FIG. 1 system; the operation of the control of the group of switches 104 and 115 through 121, will be as follows. Assuming that the amplitude of the signals existing at the amplifier system input (on circuit connection 30) is such that the amplitude of the output signals of octad amplifier 109 fall within the predetermined limited range indicated above, that is desired for the common output circuit 124. Under these conditions the signals from amplifier 109 are passed through the switch 118 to the common output circuit 124. Switch 118 is held closed by reason of the signal applied to the control circuit thereof, which control circuit is connected to the output of the and gate 142. Thus, this and gate is providing an enable signal for the switch 118 by reason of the fact that the next succeeding stage of amplification of the system signals (octad amplifier 110) is providing an output that is greater than the predetermined amplitude. Therefore the comparator circuit 132 has its outputs switched over to give enable and inhibit signals at the corresponding output circuit thereof. The enable signal from this comparator circuit 132 is applied to the and gate 142 over the illustrated circuit; and since the comparator circuit 131 is not providing an inhibit and enable signals therefrom, there is no inhibit signal being applied to the and gate 142, which would counteract the enable signal.

It is pointed out that all of the amplifiers succeeding octad amplifier 109 in the series (110, 111 and 112) will be providing output signals that exceed the predetermined amplitude so that the comparator circuits controlled thereby will be switched over. Therefore the inhibit signals from these comparator circuits (132, 133 and 134) will be in control of the corresponding switches 119, 120 and 121 via the inhibit and circuits 143, 144 and 145. Thus, all of these switches (119, 120, 121) will be open.

Also at the same time, the amplifiers preceding the amplifier 109 (i.e. 102, 107 and 108) will have output signals with amplitudes less than the predetermined amplitude so that the comparator circuits controlled thereby will not be switched over. Therefore there will not be an enable signal from any of the comparator circuits 128, 129 and 130, and each of the switches 104, 115 and 116 will be open.

Assuming that the signal amplitudes increase so that the signals from amplifier 109 exceed the predetermined amplitude, then the comparator circuit 131 will be actuated to provide inhibit and enable signals therefrom. Also the and gate 142 will be held to a negative potential by its inhibit signal (from circuit 131) and consequently the bidirectional switch 118 will be opened. However, at the same time the previous or preceding and gate 141 will pass the enable signal (from circuit 131) for closing the bidirectional switch 117.

Now, assuming that the signal amplitudes decrease to less than one-eighth of the predetermined maximum at the output of amplifier 109; then the level of amplitudes of signals from amplifier 110 will fall to less than the predetermined maximum (which they were exceeding). Consequently comparator circuit 132 will flip back at its outputs and stop providing an enable signal to and gate 142. Therefore gate 142 will not pass any positive potential and the switch 118 will be opened. Simultaneously, however, the change in state of comparator 132 will remove the inhibit signal output therefrom; and consequently the and gate 143 will pass a positive signal which will act to close switch 119.

In the foregoing manner, the switches are automatically actuated so as to have closed only that switch which will pass the signals that are at amplitudes that are within the predetermined desired range. This takes place continuously without any substantial delay since none of the octad amplifiers are permitted to become saturated, by reason of the fact that the limiter circuit arrangement shown in FIG. 3 is connected between the output of each octad amplifier and the input of the next succeeding octad amplifier.

It is pointed out that a particular type of bidirectional switch may be employed in accordance with the more detailed circuit shown in FIG. 5. In such case, however, the system arrangement should be modified in accordance with FIG. 6 to provide for the operation of the bidirectional switch according to FIG. 5.

The FIG. 5 bidirectional switch shown is in the nature of a bridge circuit having four rectifiers 241, 242, 243 and 244, one connected in each of the four bridge arms. The polarity of each of these rectifiers is connected in accordance with the accepted symbol for indicating a rectifier. Thus, they are connected to permit current flow down over both branches of the bridge from top to bottom as illustrated in FIG. 5. The bidirectional current flow circuit that is being switched, is that from an input terminal 247 to a common output terminal 248. The path for current flow includes the bridge of four diodes and also there is a resistor 249 that is connected to ground at the other end thereof, as illustrated. The upper and lower diagonal points of the bridge circuits have a pair of resistors 251 and 252 respectively, connected thereto at one end of each resistor. The other end of resistor 251 has a positive potential source connected thereto, while the other end of resistor 252 is connected to a negative potential source, as indicated. Control of the opening and closing of the switch is carried out in connection with signals that are introduced over circuits illustrated having control terminals 255 and 256. There is another rectifier 257 that is connected with its polarity as indicated, between the terminal 255 and the upper diagonal point to which the lower end of resistor 251 is connected. Similarly, there is another rectifier 258 that is connected between the other control terminal 256 and the lower diagonal point of the bridge, that has one end of resistor 252 connected thereto.

It will be observed that there is an indication by means of schematic symbols shown adjacent to the control terminals 255 and 256, that the control of the bidirectional switch is had by the simultaneous application of signals that shift the potential from negative to positive at terminal 255 and from positive to negative at terminal 256. The operation of the bidirectional switching action may be readily understood from the following indication of what happens in the circuit. The switch is closed, or on, when current is flowing vertically down across the bridge network. This takes place so long as the control terminal circuits are not carrying any current, since the path for current flow from the positive potential at the free end of resistor 251 to the negative potential at the free end of resistor 252 is closed with the rectifiers 241, 242, 243 and 244 all connected having their polarity in the proper direction for such flow. Under these conditions, bidirectional A.C. current may flow across the bridge from the input terminal 247 to the output terminal 248 by reason of the fact that the rectifiers are conducting current. However, when the vertical current flow of energy across the bridge is cut off, the switch circuit across the horizontal diagonal of the bridge is opened since the polarity of the diodes is such that there is no free flow path for either positive or negative current flow.

The cutting off of the vertical direction current flow is accomplished by application of signals in accordance with the illustrated symbols. The action in the circuit may be traced as follows: If a negative signal is applied to terminal 255 and at the same time a positive signal is applied to terminal 256, the additional current flow that is caused through resistor 251 (when the terminal 255 becomes negative) causes the potential of the upper diagonal point of the bridge circuit to become negative with respect to the potentials at the horizontal diagonal points. Similarly, the bottom half of the bridge is also effectively cut off by the application of the positive potential at terminal 256 which allows current to flow through rectifier 258 and resistor 252 so that the potential of the lower diagonal point of the bridge becomes enough more positive than it was so that the rectifiers 244 and 243 become back biased.

In order to use a bidirectional switch in accordance with the FIG. 5 showing, in the system according to FIG. 1, the modification in accordance with FIG. 6 must be carried out. Thus, taking for example a comparator circuit 131' and the next adjacent comparator circuit 132' and operating a bidirectional switch 118' therefrom; the circuit arrangement will be shown in FIG. 6. Likewise, there is an inhibit and gate 142' and also the next adjacent inhibit and gate 143'. It is pointed out that these elements, illustrated in FIG. 6, correspond with the elements shown in the system of FIG. 1. Furthermore, the same reference numbers are employed but a prime mark is added in the FIG. 6 illustration.

Because the bidirectional switch 118' is the FIG. 5 type which employs two control circuits, there must be additional circuit connections provided to accommodate the additional control signals. Thus, there is an or buffer element 260 that is connected to both the inhibit signal circuit of comparator circuit 132' and the enable signal circuit of the comparator 131'. This arrangement provides for the simultaneous additional control signal that is of the opposite sign. The operation of the bidirectional switch 118' is in accordance with FIG. 5, while the operation insofar as the system is concerned is substantially like the operation of the comparable switch, e.g. switch 118 of the system shown in FIG. 1. Thus, it will be clear to anyone skilled in the art that the FIGS. 5 and 6 showings indicate a modification which may be directly applied to the system as shown and described previously in connection with FIG. 1.

*Brief system operation*

A brief review of the operation of the system illustrated in FIGS. 1 and 1a may be coordinated with reference to the FIG. 2 illustration where the physical lay down of the digital data on the magnetic tape 11 is illustrated.

Commencing with the first millisecond period and referring to FIG. 1a, a clock pulse will pass through the start gate 18 and will cause the blank position of the multiplex switching circuits to be actuated and thus produce a millisecond pulse over the circuit connection 34 (FIG. 1) which will carry to the three different circuits indicated previously, so as to go into the time counter 35 (FIG. 1a) and also to go to the inverter 53 as well as over channel 1 to the recording amplifier 96, for recording on the second channel of the tape from one edge.

After the required delay, all of the recording amplifiers 93, 96, 175 and 90 as well as 177, will be activated or triggered, to provide a "bit" of data at the corresponding magnetic recording head 13 wherever the input to the amplifier, in each case, is indicative of a positive bit of digital data. This will be the data recorded transversely across the magnetic tape 11, at the location indicated in FIG. 2 as the "time of sample 1."

The next clock pulse will pass through the start gate 18 (FIG. 1a) and go to the control circuits 26 (FIG. 1) so as to shift the multiplex switches 29 to the first position after the blank and connect the corresponding geophone 15 (number one) to the common circuit 30 that leads to the inputs of the serially connected octad amplifiers (102, 107–112). This geophone signal will thus be sampled and converted to a digital representation. This representation includes the representation of the amplitude within the predetermined range, that is digitally represented at the output circuit from the converter 41 (FIG. 1a), plus the digital indication of which of the ranges of amplitude the signal lies within. The latter is digitally indicated by the lower three channels employing the or buffer elements 80, 81 and 82. Thus, after the required delay, the recording amplifiers will be activated as before and the digital data of bits (when present) will be recorded transversely across the magnetic tape 11 as before. Of course, this set of recorded bits are spaced longitudinally from the previous set of digital bits, by reason of the movement of the tape 11 as it travels under the recording heads. For the remaining forty-two clock pulses thereafter, the multiplexing switches are acting to successively connect the remaining geophones 15 (number 2–43) to the input circuit 30 of the system. In this manner the recording process is repeated, making a digital record of a sample of the signal provided by each geophone trace.

Of course, the foregoing repeats continuously for the duration of a record, so that each millisecond period of time includes the complete recording of the time count, plus the sampling of each of the forty-three traces. Now, of course, if it is desired to reconstruct the data in accordance with the usual oscillograph recording display, it will be necessary to run the magnetic tape record through a reversing system in order to recreate from the digitally recorded data, the analog trace information, to be recorded oscillographwise on adjacent traces.

While a preferred embodiment of the invention has been described in considerable detail in accordance with the applicable statutes, this is not to be taken as in any way limiting the invention but merely as being descriptive thereof.

I claim:

1. A seismic recording system comprising in combination means for detecting seismic energy in the earth and producing an analog signal in accordance therewith, said signal having a dynamic amplitude range that is too great for recording mediums without compression, means for converting said analog signal to a digital signal at frequent intervals relative to a period of the analog signal, said converting means including means for amplifying said analog signal in a plurality of steps of amplification, a common output circuit for receiving signals alternatively from one of said steps of amplification of said amplifier means, switch means for connecting said common output circuit with said amplifying means, means for determining the amplitude of signals from said steps of amplification of said amplifier means and for actuating said switch means to close only one of said connections in the alternative, means for indicating which one of said switch means is closed, and means for recording said digital signals.

2. A seismic recording system comprising in combination means for detecting seismic energy in the earth and producing an analog signal in accordance therewith, said signal having a dynamic amplitude range that is too great for recording mediums without compression, means for converting said analog signal to a digital signal at frequent intervals relative to a period of the analog signal, said converting means including means for amplifying said analog signal in a plurality of steps of amplification, a common output circuit for receiving the amplified signals from each of said steps of amplification, a plurality of switches for connecting said common output circuit with said steps of amplification of said amplifier, a plurality of comparators each connected to one of said steps of amplification and each providing a pair of outputs so long as the amplified signals from said associated step of amplification of said amplifier exceeds a predetermined value, means for controlling said switches from said pairs of comparator outputs to close only one of said switches at a time, means for indicating which one of said switch means is closed, and means for recording said digital signal.

3. The invention according to claim 2 wherein said amplifying means includes a direct connection circuit for providing a step of zero amplification.

4. The invention according to claim 3 wherein said plurality of switches are electronic.

5. A seismic recording system comprising in combination means for detecting seismic energy in the earth's surface and producing an analog signal in accordance therewith, said signal having a dynamic amplitude range that is too great for recording mediums without compression, means for converting said analog signal to a digital signal at frequent intervals relative to a period of the analog signal, said converting means including a plurality of amplifiers in series, a common output circuit for all of said amplifiers, switch means between each of said amplifiers and said common output circuit, means for controlling said switch means in accordance with the outputs of said amplifiers so that only one switch means is closed at a time to pass a predetermined range of signal amplitude, means for indicating which one of said switch means is closed, and means for recording said digital signals.

6. A seismic recording system comprising in combination means for detecting seismic energy in the earth's surface and producing an analog signal in accordance therewith, said signal having a dynamic amplitude range that is too great for recording mediums without compression, means for converting said analog signal to a digital signal at frequent intervals relative to a period of the analog signal, said converting means including a plurality of fixed gain amplifiers in series, a common output circuit for all of said amplifiers, switch means between each of said amplifiers and said common output circuit, means for controlling said switch means in accordance with the outputs of said amplifiers so that only one switch means is closed at a time to pass a predetermined range of signal amplitude, said switch controlling means comprising comparison means coupled between each of said amplifiers and each of said switch means for disabling the switch means and enabling the preceding switch means whenever the signal from the associated amplifier exceeds a predetermined value, binary circuit means for indicating which one of said switch means is closed, and means for recording said digital signals.

7. A digital seismic recording system comprising in combination a plurality of geophones for detecting seismic energy in the earth's surface and producing analog signals in accordance therewith, multiplex switching means for sampling said analog signals sequentially at frequent intervals relative to a period of the analog signals, a plurality of amplifiers in series for amplifying the output of said multiplex switching, a common output circuit for all of said amplifiers, switch means between each of said amplifiers and said common output circuit, means for controlling said switch means in accordance with the outputs of said amplifiers so that only one switch means is closed at a time to pass a predetermined range of signal amplitude, means for indicating which one of said switch means is closed, high speed analog to digital converter means connected to said common output circuit for converting said geophone analog signals to digital signals as received sequentially from said common circuit, and means for recording said digital signals.

8. A digital seismic recording system according to claim 7 additionally including a digital time counter, and means for recording the time count during each multiplex switching cycle.

No references cited.

SAMUEL FEINBERG, *Primary Examiner.*